(12) United States Patent
Dholakia

(10) Patent No.: US 8,192,635 B2
(45) Date of Patent: Jun. 5, 2012

(54) METHOD FOR REDUCING CLOGGING OF FILTERS

(76) Inventor: Jayant M. Dholakia, Chandler, AZ (US)

( * ) Notice: Subject to any disclaimer, the term of this patent is extended or adjusted under 35 U.S.C. 154(b) by 325 days.

(21) Appl. No.: 12/386,615

(22) Filed: Apr. 20, 2009

(65) Prior Publication Data

US 2010/0264087 A1  Oct. 21, 2010

(51) Int. Cl.
*B01D 37/00* (2006.01)
(52) U.S. Cl. .................... 210/792; 210/807
(58) Field of Classification Search ........... 210/170.03, 210/263, 269, 747.3, 792, 807
See application file for complete search history.

(56) References Cited

U.S. PATENT DOCUMENTS

| | | | |
|---|---|---|---|
| 3,876,546 A | 4/1975 | Hsiung | |
| 4,696,319 A | 9/1987 | Gant | |
| 5,178,768 A | 1/1993 | White | |
| 5,226,902 A * | 7/1993 | Bae et al. ............... | 604/892.1 |
| 5,281,332 A | 1/1994 | Vandervelde | |
| 5,303,663 A | 4/1994 | Salestrom | |
| 5,382,270 A | 1/1995 | Graham | |
| 5,578,213 A | 11/1996 | Miller | |
| 5,707,527 A | 1/1998 | Knutson | |
| 6,649,048 B2 | 11/2003 | de Ridder | |
| 7,045,067 B2 | 5/2006 | Brown | |
| 7,163,630 B2 | 1/2007 | Chilcote | |
| 7,316,919 B2 | 1/2008 | Childs | |
| 7,419,591 B2 | 9/2008 | Aberle | |
| 7,501,380 B1 | 3/2009 | Rainer | |
| 2004/0129654 A1 * | 7/2004 | Posten .................. | 210/807 |
| 2006/0163136 A1 | 7/2006 | Patil | |
| 2008/0044472 A1 * | 2/2008 | Garcia et al. .......... | 424/484 |
| 2009/0242833 A1 * | 10/2009 | Chen et al. ............ | 252/194 |

OTHER PUBLICATIONS

Colleen Gorey, Grafting of Stimuli Responsive Polymer Films to Ultrafiltration Membranes, May 2008, Masters Thesis, University of Toledo.*

* cited by examiner

*Primary Examiner* — Matthew Savage

(57) ABSTRACT

A method for improving the service life of passive filtration and infiltration devices. Contaminated water, such as stormwater runoff or wastewater, is filtered through a media comprising of a mixture of filter media and stimuli-responsive polymer particles. The polymer particles reversibly expand/contract in response to changes in certain environmental stimuli, resulting in increased macropores and breakup of sediment and crust that would otherwise reduce hydraulic flow. The method is effective in a variety of passive devices, including conventional particulate filters, infiltration systems, and high loading canister, cartridge and catch basin filter devices.

14 Claims, 3 Drawing Sheets

METHOD FOR REDUCING CLOGGING OF FILTERS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

The present invention relates to clogging and means of reducing such in filters that are used for the removal of contaminants from liquids.

2. Prior Art

The 1972 Clean Water Act (CWA) has been the basis of increasing regulatory controls of both point and nonpoint source pollution. Direct discharges or "point source" discharges are from sources such as pipes and sewers. Nonpoint source (NPS) pollution, unlike pollution from industrial and sewage treatment plants, comes from many diffuse sources and is caused by rainfall or snowmelt moving over and through the ground. As the runoff moves, it picks up and carries away natural and man-made pollutants, finally depositing them into lakes, rivers, wetlands, coastal waters, and underground sources of drinking water. The objective of the CWA is to restore and maintain the chemical, physical, and biological integrity of the nation's waters by preventing point and nonpoint pollution sources, providing assistance to publicly owned treatment works for the improvement of wastewater treatment, and maintaining the integrity of wetlands. Pollutants regulated under the CWA include "priority" pollutants, including various toxic pollutants; "conventional" pollutants, such as biochemical oxygen demand (BOD), total suspended solids (TSS), fecal coliform, oil and grease, and pH; and "non-conventional" pollutants, including any pollutant not identified as either conventional or priority.

In 1987, the CWA was amended to require EPA to establish a program to address stormwater discharges. In response, EPA promulgated the Pollutant Discharge Elimination System (NPDES) stormwater permit application regulations (EPA, 2004). These regulations require that facilities with the following stormwater discharges apply for an NPDES permit: (1) a discharge associated with industrial activity; (2) a discharge from a large or medium municipal storm sewer system; or (3) a discharge which EPA or the state/tribe determines to contribute to a violation of a water quality standard or which is a significant contributor of pollutants to waters of the United States. As part of stormwater permits, facilities are often required to implement pollution prevention plans, which identify potential sources of pollution and describe and ensure the implementation of practices that reduce the pollutants in stormwater discharges. These practices are referred to as best management practices (BMPs). Through a variety of programs (including, as appropriate, non-regulatory or regulatory programs), states assist and encourage producers to use best management practices to reduce or prevent instances of nonpoint source pollutants migrating into waters.

Best management practices that provide treatment of contaminated stormwater and wastewater include those that utilize filtration or infiltration. Sand filters have proven effective in removing pollutants from stormwater runoff (EPA, 1999) and on-site wastewater treatment (EPA, 2002). A typical sand filter system consists of a pretreatment or sedimentation chamber, which removes heavier suspended solids that can clog the downstream filter, and a filtration chamber, which removes additional pollutants by filtering through a sand bed. The treated filtrate normally is then discharged through an underdrain system. Traditional stormwater sand or media filters are considered low loading rate treatment systems. For relatively higher loading rate applications, for example at sites where space is constrained, there are a number of proprietary "ultra-urban" canister or cartridge based filter systems available. These devices consist of individual canisters or cartridges that filter stormwater runoff by passing it radially or vertically up through various types of media. Many of these devices are part of "drop-in" systems, and incorporate some combination of filter media, hydrodynamic sediment removal, oil and grease removal, or screening to remove pollutants from stormwater (EPA, 2004). Infiltration practices (basins and trenches) are long, narrow stone or gravel-filled excavated trenches. Stormwater runoff is stored in the basin or in a trench, in voids between the stones or gravel, and slowly infiltrates into the soil matrix below. Infiltration devices are normally combined with pretreatment practices such as a grass swales or sediment basins to prevent premature clogging at the soil/water interface (EPA, 2004).

One of the most significant drawbacks to filtration and infiltration systems is premature clogging of the surface due to buildup of solids (Woelkers et al., 2006). Granular media filters and infiltration soils accumulate solids on the top surface that form a layer of crust. Most of the filtration occurs in this layer once it forms, resulting in rapid clogging and a relatively short service cycle. Where possible, treatment systems are vegetated because the presence of vegetation can help breakup this crust layer, and growing roots increase the availability of macropores for water to infiltrate. In industrial and drinking water treatment, filters are backwashed periodically to restore hydraulic flow, or other novel mechanical methods may be used (U.S. Pat. No. 7,163,630). This is not possible in typical stormwater and wastewater filtration and infiltration devices that operate passively (without power) under gravity filtration. These systems therefore require periodic raking or removal of the surface sediment and top layer of media and, after prolonged use, complete replacement of the media layer. In general, the trade off in granular filter design is between using small grain size filter media which improves treatment but results in quicker clogging, and using coarser grain size media which provides poorer treatment but prolongs hydraulic capacity. A major constraint therefore to use of passive filtration and infiltration treatment practices is rapid or premature clogging, which either makes them impractical, such as under high loading rate application, or increases operational and maintenance costs.

The most common method of extending the hydraulic service life of filters and infiltration systems is to provide some level of pretreatment to the contaminated water. This includes removing suspended particles by storing the water for a period of time in a detention basin (sedimentation) or filtering it through an area of vegetation (biofiltration) before treatment by the filter or soil. Although effective, these solutions require additional space for implementation, and are associated with their own maintenance costs. Dual layer filters, in which a coarse grain size media layer is on top of a finer grain size layer, is another technique used to prolong the hydraulic life of filters (Sutherland, 2008; U.S. Pat. Nos. 7,045,067; 5,281,332; 3,876,546). Here, the top coarse layer can be considered a prefilter for the bottom finer layer. During filtration, particles are trapped within the whole depth of the upper layer via "depth filtration" and not just on the surface. Although dual and multilayer granular filters can have longer service runs, premature clogging is still of concern when loading rates are high (Sutherland, 2008), as is the case in urban areas where treatment device size is restricted by availability of space. In addition, use of a coarser upper layer results in a deterioration in the treatment efficiency of the filter. Ultra-urban filter devices incorporate vertical flows or use relatively coarser media or media in pellet form to prevent premature clogging of the media (U.S. Pat. Nos. 7,419,591; 6,649,048; 5,707,527). Other methods used to prolong the hydraulic service life of passive filters include prefiltration through one of more layers of sheet geotextile (Woelkers et al., 2006). Recent prior art suggests adding plastic pellets that are larger than the granular media can also increase the hydraulic capacity of passive filters (U.S. Patent A1 2006/0163136). The prior art clearly indicates a need for novel techniques that can extend the service life of passive filtration and infiltration devices, and thereby reduce the maintenance costs associated with them.

Polymer gels are a class of polymer materials that comprise an elastic network of cross-linked polymers and a solvent. In its dry state, a polymer gel behaves like a solid. When immersed in a solvent, it is able to absorb the solvent and swell, and behaves more like a gel. The properties of a polymer gel mainly depend on the degree of cross-linking, the chemical composition of the polymeric chains, and the interaction between the network and surrounding liquids. Many polymer gels, particularly organic-based polymer gels, can expand or contract and make large reversible changes in volume (up to 1000 times their original size) when they contact and absorb the solvent. There are two groups of polymers that are of interest here: the traditional polymer gels that expand on contact with a solvent and contract when dried; and the stimuli-responsive polymers which only expand or contract in response to certain stimuli. When the solvent is water, these polymers are called traditional hydrogels and stimuli-responsive hydrogels.

Traditional hydrogels have found a wide range of uses in agriculture, food industry, biotechnology, environmental sciences, and other fields. The prior art shows a number of inventions in the field of irrigation and agriculture that claim use of traditional hydrogels. U.S. Pat. No. 4,696,319 describes a moisture-activated apparatus for controlling the flow of water. Expansion on absorption and contraction on desorption of water by a water-swellable material is used to cause the valve stem of the valve to move between closed and open positions. In U.S. Pat. No. 5,303,663, the use of polymers is discussed for effective control and utilization of irrigation water, and the stated advantage is that the technology creates a "blanket" of moisture retaining particles for the plant roots. In one controlled application, it is stated that polymer treated field produces approximately 35% more hay while using 50% less water and 50% less fertilizer than in an adjacent field which had not been treated. U.S. Pat. No. 5,382,270 discusses growing of plants within a medium of hydrogel granules swollen by aqueous nutrient solution. The hydrogel serves to support the plants and the aqueous nutrient medium, which has to be supplemented from time to time, feeds the plants. In this application, the proposed hydrogels expand as they absorb water and plant nutrients.

There is limited prior art on the use of traditional hydrogels in water treatment devices. U.S. Pat. No. 7,501,380 specifies a blended composition of hydrogel polymer granules capable of selectively removing toxic dissolved metal species from water, and spacer particles which minimize contact between contiguous polymer granules for reducing the impedance of water. The invention claimed is a compacted and confined granular filter bed for removing dissolved metals from water. U.S. Pat. No. 5,178,768 proposes a mixed filter bed composition that comprises of various media and about 5% to about 20% by weight of silica hydrogel. The silica hydrogel, which is an inorganic hydrogel, is used to prevent growth of bacteria. U.S. Pat. No. 5,578,213 describes a method of treating wastewater containing particulate matter and free oil, which comprises a series of treatment steps that end with contacting the wastewater with an adsorbent bed to form a purified water stream. The adsorbent bed is claimed to comprise of one or more components selected from the group consisting of carbonous sorbent, activated alumina, silica hydrogel, zeolite, and metallic components. U.S. Pat. Nos. 7,501,380, 5,178,768, and 5,578,213 described above all claim use of chemical properties of traditional hydrogels. There is no prior art on the use of the expansion-on-wetting and contraction-on-drying physical property of traditional hydrogels to help prevent premature clogging in passive treatment devices.

In the last decade, there has been considerable research on a new group of polymers that can respond to changes in environmental conditions such pH, temperature, light, ionic strength, voltage, external pressure, solvent composition, or other stimulus. These stimuli-responsive, intelligent, or smart polymers can reversibly change their physical or chemical properties in response to these environmental stimuli (Roy and Gupta, 2003; Kopecek, 2007). The majority of research on stimuli-responsive polymers has been on stimuli-responsive hydrogels because of their applicability in drug delivery, biomaterials, and biomedical devices such as miniature artificial valves and muscles. Stimuli-responsive polymers typically consist of cross-linked polymer network structure containing the stimuli-responsive component in the polymer chains. When these polymers are stimulated, they will absorb water and expand in size or release absorbed water and contract in size. The prior art on application of stimuli-responsive polymers/hydrogels in water treatment applications is limited to membrane filtration. U.S. Pat. No. 7,316,919 describes one such application, a composite material that comprises a support member with a plurality of pores and, located in the pores of the support member, a macroporous cross-linked gel that can respond to environmental stimulus. The composite material is claimed to be suitable for separation of substances, for example by filtration or adsorption, including chromatography, for use as a support in synthesis or for use as a support for cell growth. There is no prior art on the use of the physical property of reversible expansion/contraction of stimuli-responsive polymers/hydrogels to help prevent premature clogging in passive filtration and infiltration devices.

In conclusion, the prior art shows that clogging of "passive" or gravity flow filtration and infiltration devices is a concern in terms of service life and maintenance costs. Traditional methods to prevent premature clogging, such as pretreatment by sedimentation or use of depth filtration techniques, require additional space, have their own maintenance needs, and do not overcome the need for frequent maintenance when loading rates are relatively high. The prior art shows that use of hydrogels in granular filters has been limited to potential benefits from their chemical properties (e.g. U.S. Pat. Nos. 5,178,768; 5,578,213; 7,501,380). There is no prior art on the use of the physical property of reversible expansion and contraction of stimuli-responsive polymers/ hydrogels to help prevent premature clogging in passive filtration and infiltration devices.

This invention claims a new and unobvious use for stimuli-responsive polymers. It discloses a method of filtering contaminated water, such as stormwater runoff and wastewater, through granular filter media or soil to which is added stimuli-responsive polymer particles. The property of these stimuli-responsive polymers that makes them suitable for reducing the rate of clogging in passive treatment devices is the large and reversible change in volume in response to certain environmental stimuli. The expansion and contraction of the polymer particles in response to certain environmental conditions will increase creation of macropores that improve depth filtration, and help physically break up the sediment buildup that causes hydraulic failure. This invention replicates the observed benefits of vegetation and roots in increasing macropore structures and preventing premature clogging. The benefit of this invention over prior art is reduced maintenance needs and associated costs because the method increases service life.

The method comprises passing the contaminated water through a layer of material comprised substantially of filter media and stimuli-responsive polymer particles. The filter media is selected from the group consisting of granular filter media and soil. The stimuli-responsive polymer particles further have a predetermined size and shape and are capable of undergoing a reversible volume change in response to a change in one or more environmental conditions. The environmental conditions include temperature, pH, water composition, light intensity, light wavelength, electric field, magnetic field, pressure, and ionic strength wherein occurrence of at least one of the environmental conditions causes the stimuli-responsive particles to expand or contract, wherein expanding and contracting the stimuli-responsive particles in response to the environmental conditions results in an increase in macropores in the layer of material and breaks up of sediment and crust that would otherwise reduce hydraulic flow through the layer of material. The contaminated water can be stormwater runoff or wastewater. The stimuli-responsive polymer particles can be spherical, cylindrical, or tubular shape, and can be solid or hollow. The granular filter media is selected from the group consisting of sand, perlite, limestone, dolomite, gravel, soil, and other natural media. The granular filter media can also be selected from the group consisting of activated carbon, coated sand, and other manufactured media. The granular media can be a mixture of two or more different media.

SUMMARY

Presented is a method for prolonging the service life of passive contaminated water filtration and infiltration devices. The method involves filtering the contaminated water through a granular media or soil to which is added stimuli-responsive polymer particles. The method increases service life and reduces the frequency of clogging because reversible expansion and contraction of the stimuli-responsive polymer particles results in increased macropores and breakup of sediment and crust that would otherwise reduce hydraulic flow.

DRAWINGS

DETAILED DESCRIPTION

It is an objective of the present invention to improve the service life of passive contaminated water filtration and infiltration devices.

Figure 1:
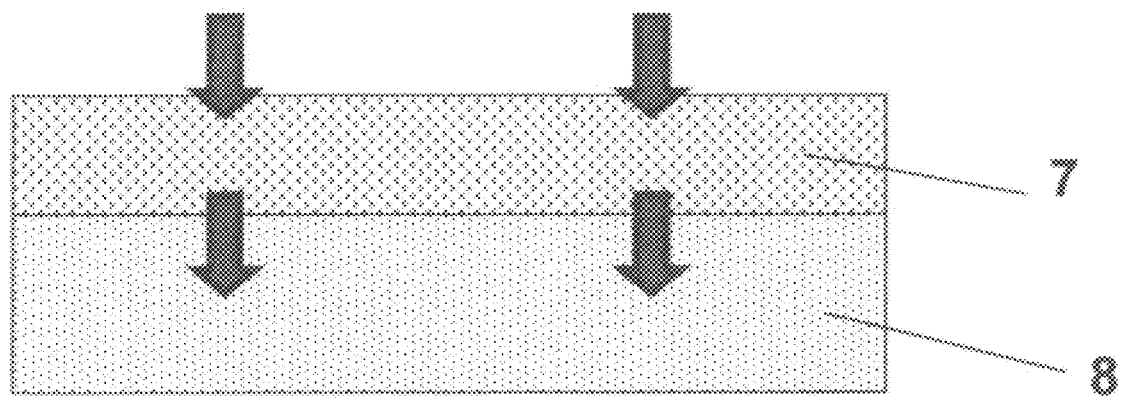
FIG. 1 shows a section view of contaminated water filtering through a mixed layer of media and stimuli-responsive polymer particles over a layer of media.

Those skilled in the art will understand that there are a large number of embodiments for potential uses of reversibly expanding/contracting polymers in general, and hydrogels in particular, in reducing clogging in passive contaminated water treatment devices or practices. One such embodiment is shown in FIG. 1. In this embodiment, contaminated water is treated by filtering through a layer 7 comprising of mixed media, such as granular filter media or soil, and stimuli-responsive polymer particles, and then filtering through an underlying media layer 8 that does not have hydrogel particles. Media layer 8 could be soil, in which case this embodiment would represent use of the invention in a passive soil-based infiltration practice.

Figure 2:
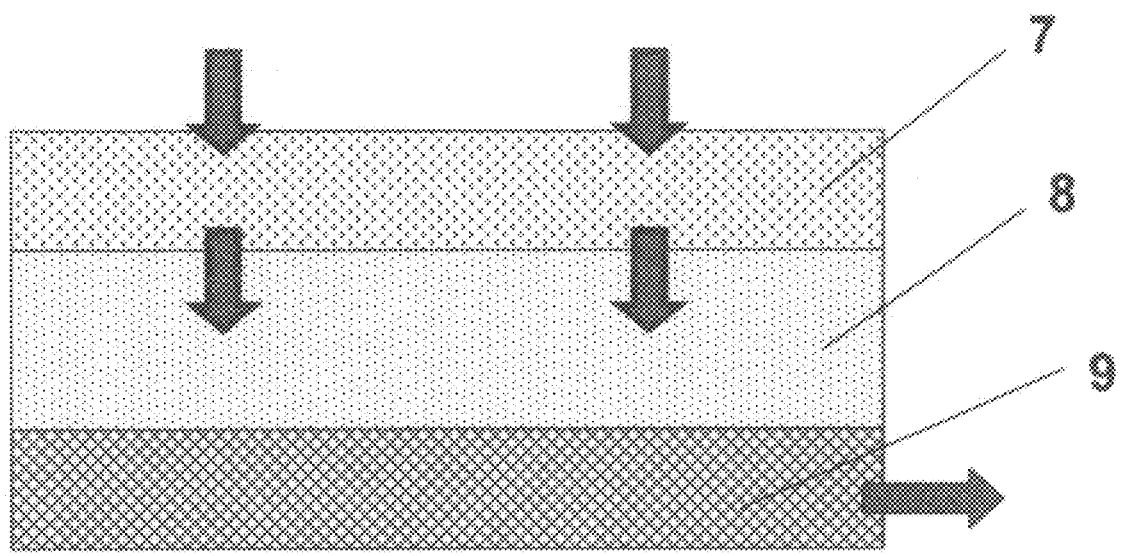
FIGS. 2 and 3 show section views of contaminated water filtering through a mixed layer of media and stimuli-responsive polymer particles with underdrains below.

Another embodiment is shown in FIG. 2. In this embodiment, contaminated water is treated by filtering through mixed media layer 7, which contains the stimuli-responsive polymer particles, then through underlying media layer 8, before entering an underdrain system 9 and exiting the treatment device. Media layer 8 could be a granular filter media such as sand, in which case this embodiment would represent use of the invention in a passive treatment filter.

Figure 3:
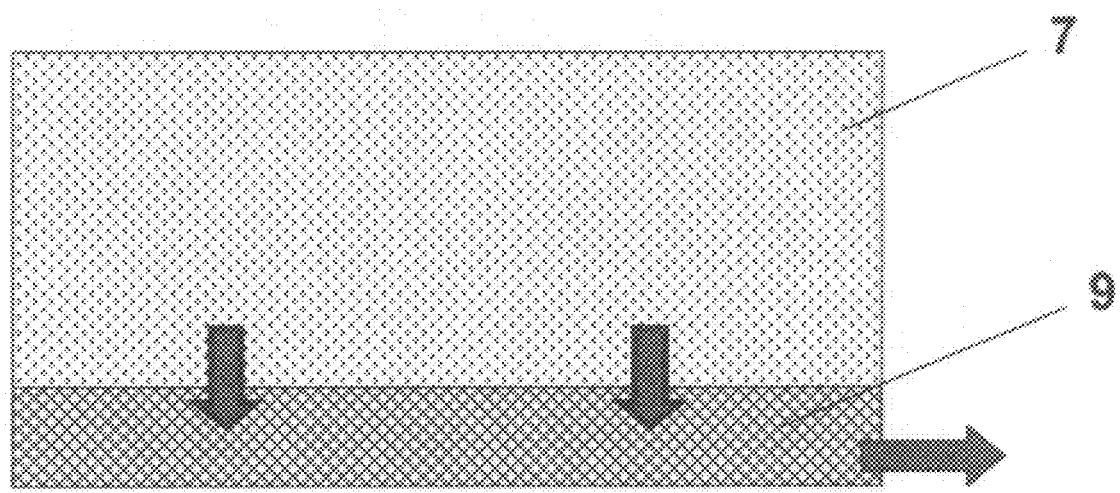

A further embodiment involves filtering contaminated water through mixed media layer 7, which contains the stimuli-responsive polymer particles, and then straight into an underdrain system 9 before exiting the treatment device. This embodiment is illustrated in FIG. 3.

Figure 4:
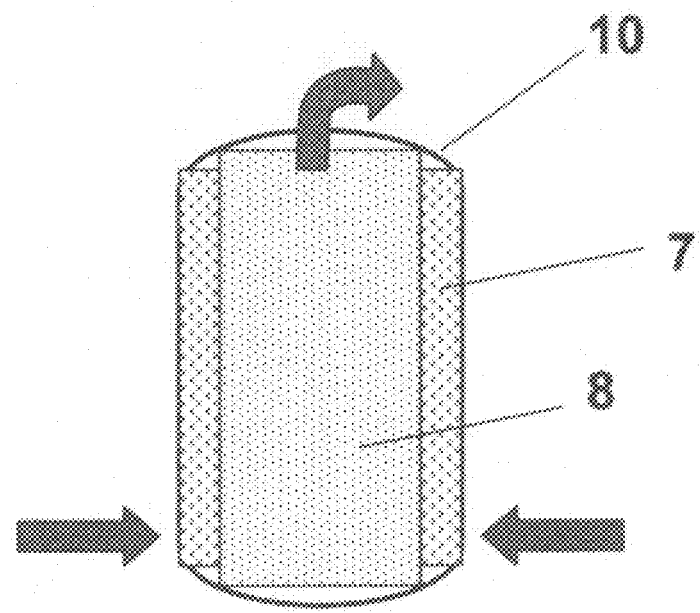
FIGS. 4 and 5 show section views of contaminated water filtering through a volume of mixed media and stimuli-responsive polymer particles in canister or cartridge type filter devices.

In the embodiment shown in FIG. 4, the contaminated water is treated by passing it into a conventional canister or cartridge device 10, filtering it through a volume of mixed media 7 containing the stimuli-responsive polymer particles, and then filtering through another volume of media 8 in the core of the device 10 before exiting. For a cartridge operating in down flow mode, the influent enters at or near the top and exits at or near the bottom of the canister or cartridge 10.

Figure 5:
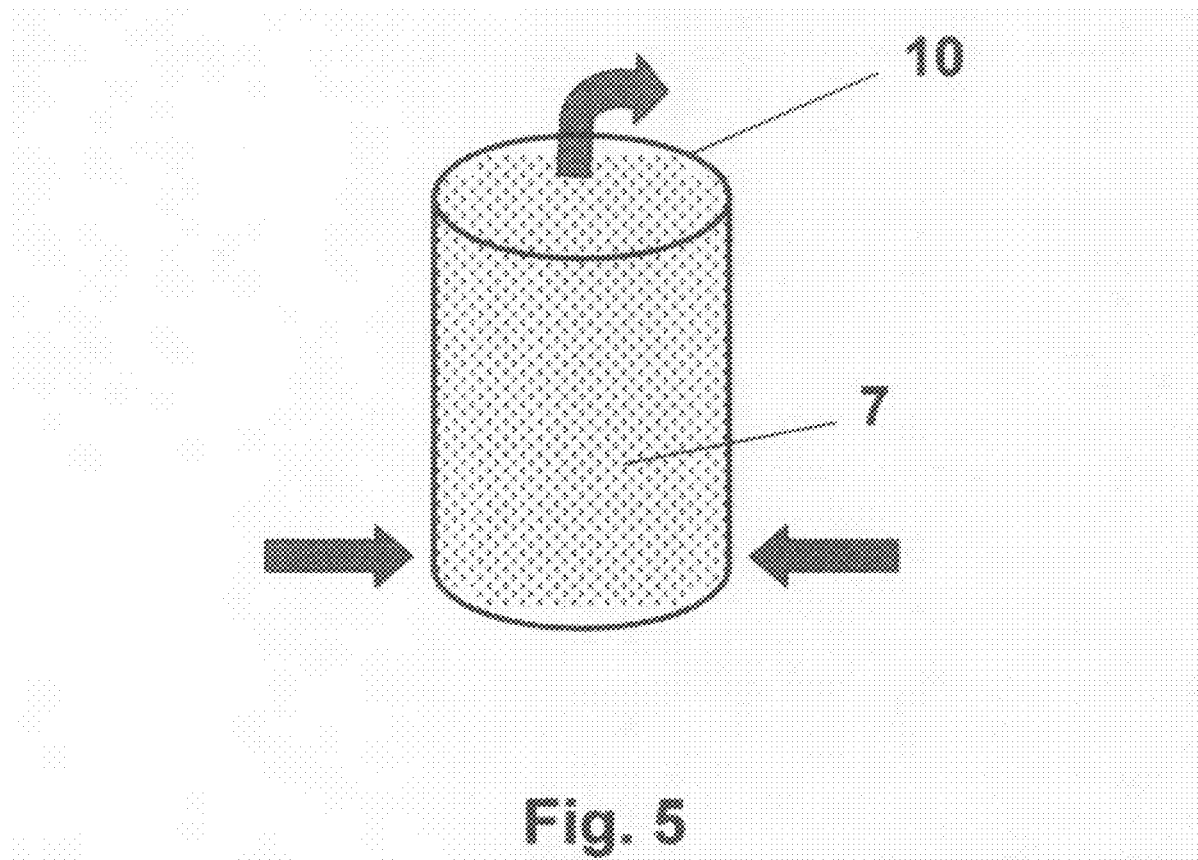

FIG. 5 shows another embodiment involving a conventional canister or cartridge device. In this embodiment, the contaminated water is treated by filtering it through a volume of mixed media 7, which contains the stimuli-responsive polymer particle, and passing it out of the canister or cartridge 10. For a cartridge operating in down flow mode, the influent enters at or near the top and exits at or near the bottom of the canister or cartridge 10.

Figure 6:
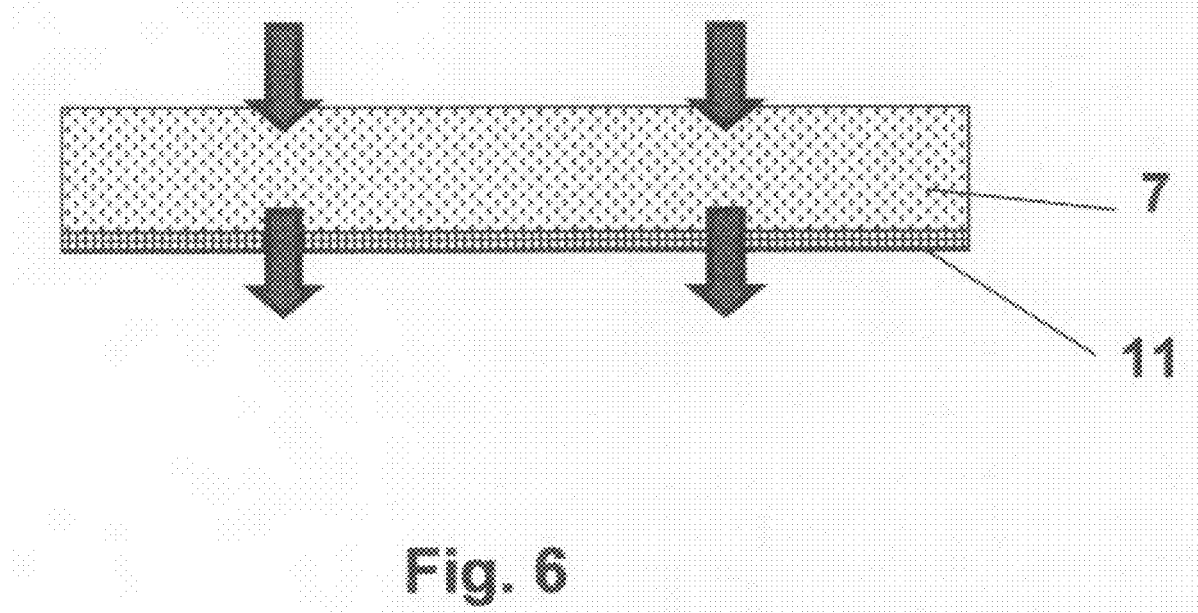
FIG. 6 shows a section view of contaminated water filtering through a mixed layer of media and stimuli-responsive polymer particles on top of a screen or fabric filter.

One other embodiment is shown in FIG. 6. In this embodiment, contaminated water is treated by filtering through mixed media layer 7, which contains the stimuli-responsive polymer particles, and then filtering through an underlying porous screen or fabric 11. This embodiment would represent use of the invention in catch basins or drain inlets, where screens and fabric filters are commonly used for capturing solids.

From the description above, a number of advantages of this new method become evident:
  (a) The method involves use of polymer particles that can be easily added to granular filter media or soil. Additional costs associated with this method are therefore expected to be minimal.
  (b) The method does not require use of power.
  (c) The method does not require additional footprint for the treatment device, since the polymer particles are on top of or mixed with the treatment media.
  (d) The method does not require use of a coarse-grain size media that would reduce treatment. Treatment is maintained unlike that in that conventional practices that utilize a layer of coarse-grain media to promote depth filtration.
  (e) The reduction in the rate of clogging and corresponding improved permeability provided by the method increases flexibility in the design of treatment devices. Treatment devices could be made smaller and operated at higher loading rates because the method is less prone to clogging. This is especially beneficial in urban areas, where space for installation of treatment devices is often constrained.

Although the description above contains specificities, these are not to be seen as limiting the scope of the method but as merely providing illustrations of some of the expected common embodiments. For example, although not illustrated, use of a layer or volume of stimuli-responsive polymer particles by themselves, with no mixing with other media, is considered within the scope of this invention. Thus, the scope of the method should be determined by the appended claims and their legal equivalents, rather than by the examples given.

The invention claimed is:

1. A method of filtering contaminated water by gravity flow, comprising passing said contaminated water through a layer of material comprising granular filter media and stimuli-responsive polymer particles, said stimuli-responsive polymer particles further having a predetermined size and shape and being capable of undergoing a reversible volume change in response to a change in one or more environmental conditions, wherein said environmental conditions are selected from the group consisting of temperature, pH, water composition, light intensity, light wavelength, electric field, magnetic field, pressure, and ionic strength, wherein occurrence of at least one of said environmental conditions causes the stimuli-responsive particles to expand or contract, and expanding and contracting the stimuli-responsive particles in response to the environmental conditions to increase macropores in the layer of material and break up sediment and crust that would otherwise reduce hydraulic flow through the layer of material.

2. The method of claim 1, wherein said contaminated water is stormwater runoff or wastewater.

3. The method of claim 1, wherein said stimuli-responsive polymer particles are spherical, cylindrical, or tubular shape.

4. The method of claim 1, wherein said stimuli-responsive polymer particles are solid or hollow.

5. The method of claim 1, wherein said granular filter media is selected from the group consisting of sand, perlite, limestone, dolomite, gravel, soil, and other natural media.

6. The method of claim 1, wherein said granular filter media is selected from the group consisting of activated carbon, coated sand, and other manufactured media.

7. The method of claim 1, wherein said granular filter media is a mixture of two or more different media.

8. A method of filtering contaminated water by gravity flow, comprising passing said contaminated water through a layer of material comprising granular filter media and stimuli-responsive polymer particles, said stimuli-responsive polymer particles further having a predetermined size and shape and being capable of undergoing a reversible volume change in response to a change in one or more environmental conditions, wherein occurrence of at least one of said environmental conditions causes the stimuli-responsive particles to expand or contract, and expanding and contracting the stimuli-responsive particles in response to the environmental conditions to increase macropores in the layer of material and break up sediment and crust that would otherwise reduce hydraulic flow through the layer of material.

9. The method of claim 8, wherein said contaminated water is stormwater runoff or wastewater.

10. The method of claim 8, wherein said stimuli-responsive polymer particles are spherical, cylindrical, or tubular shape.

11. The method of claim 8, wherein said stimuli-responsive polymer particles are solid or hollow.

12. The method of claim 8, wherein said granular filter media is selected from the group consisting of sand, perlite, limestone, dolomite, gravel, soil, and other natural media.

13. The method of claim 8, wherein said granular filter media is selected from the group consisting of activated carbon, coated sand, and other manufactured media.

14. The method of claim 8, wherein said granular filter media is a mixture of two or more different media.

* * * * *